United States Patent Office.

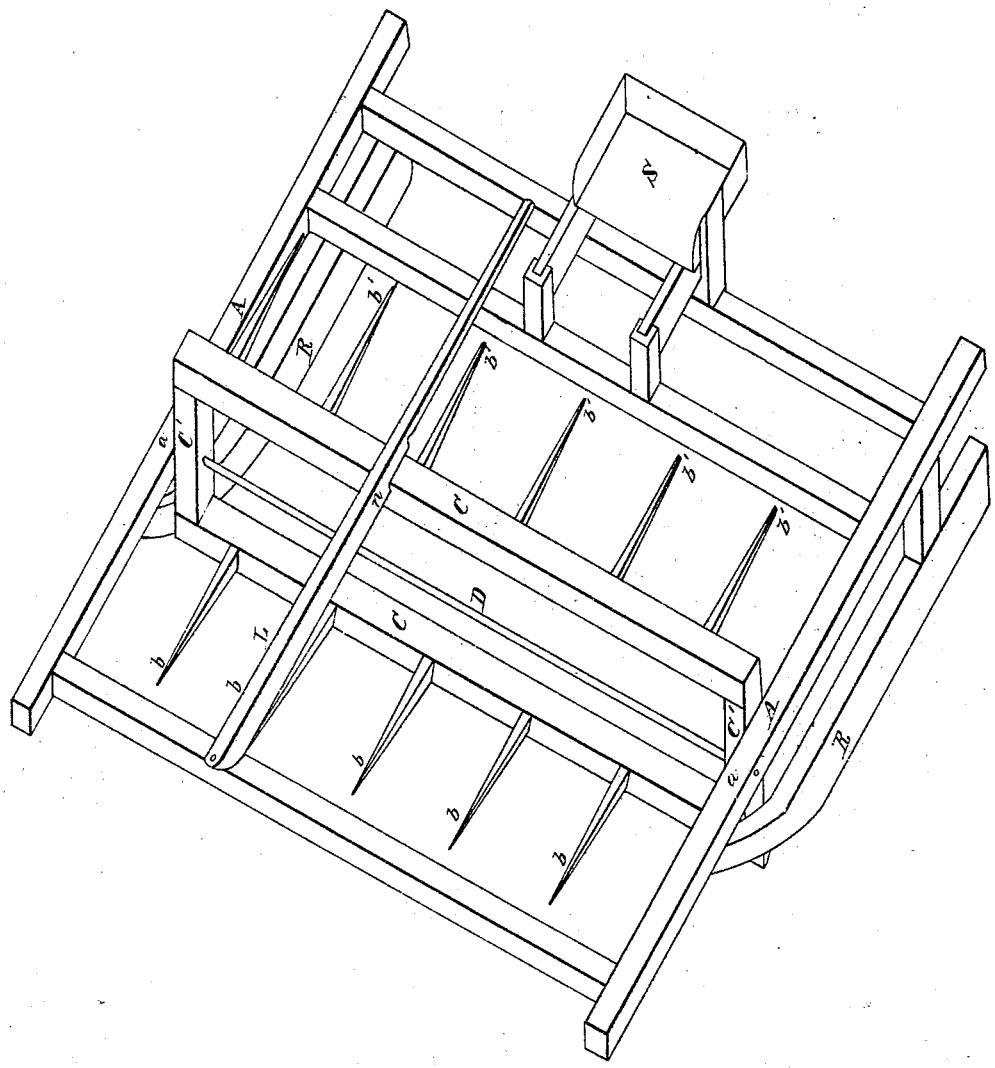

THOMAS J. TURNER, OF RICHLAND COUNTY, ILLINOIS.

*Letters Patent No. 67,688, dated August 13, 1867.*

---

IMPROVEMENT IN HORSE-RAKES.

---

*The Schedule referred to in these Letters Patent and making part of the same.*

---

TO ALL WHOM IT MAY CONCERN:

Be it known that I, THOMAS J. TURNER, of the county of Richland, and State of Illinois, have invented a new and useful Improvement in Revolving Horse-Rakes; and I do hereby declare that the following is a full, clear, and exact description thereof, reference being had to the accompanying drawing, and to the letters of reference marked thereon, which drawing represents a perspective view of my machine.

The main frame of the machine A A is mounted on a pair of runners, B B, constituting a sled or sleigh, in which the revolving rake is hung. C C is the revolving rake, consisting of two rake-heads, C C, framed together by means of two or more cross-pieces, C' C', and having an axis, D, with its journal bearings in the main frame at $a\ a$. The rake-teeth $b$ and $b'$ are so set in the rake-heads C C as to project at right angles with the plane of the revolving frame in opposite directions; that is to say, the teeth $b$, set in one rake-head, project in an opposite direction to the teeth $b'$ set in the other rake-head. R R are the runners upon which the whole machine is supported. S is the driver's seat, located in rear of the revolving rake, and at the rear end of the main frame. L is a lever, hinged to the front cross-bar of the main frame, and extending back so that its rear end will be in convenient reach of the driver. This lever has a notch or shoulder at $n$, which prevents the rake-frame C C from revolving, and holds it in a perpendicular position; that is to say, one rake-head vertically above the other. When the rake-frame is held in this position, as shown in the drawing, the teeth will project horizontally, or nearly so, the lower set of teeth $b$ being in position to gather the hay as the machine moves forward. When it is desired to drop the hay thus gathered by the rake, the driver raises the lever L, thus permitting the rake-frame to revolve; the points of the lower set of teeth $b$ come in contact with the ground, operating as a fulcrum on which the rake-frame turns, raising the whole front end of the machine. When the rake-frame has made a half revolution, so that the teeth $b'$ occupy the position previously occupied by the teeth $b$, the driver lets down the lever L, and its notch or shoulder $n$ engages with the other rake-head, and arrests the further rotary motion till the lever is again raised.

I do not claim broadly the revolving rake-frame C C; but what I do claim as my invention, and desire to secure by Letters Patent, is—

1. The revolving rake-frame constructed substantially as herein described, and hung in a frame mounted on runners, substantially as herein described.

2. In combination with a revolving rake frame as herein described, hung in a frame mounted on runners as herein described, I claim the lever L, with its notch or shoulder $n$, and a driver's seat on the rear end of the main frame, all constructed and arranged substantially as herein described.

T. J. TURNER.

Witnesses:
F. D. PRESTON,
JACOB LANDIS.